Figure 1:
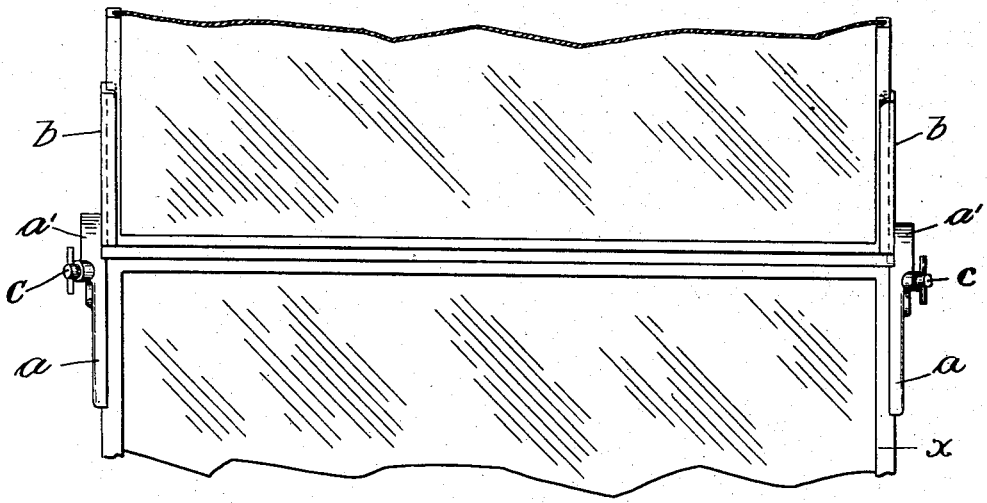

S. R. BAILEY.
LOCK JOINT FOR AUTOMOBILE WIND SHIELDS.
APPLICATION FILED DEC. 14, 1914.

1,171,829.                                                Patented Feb. 15, 1916.

Witnesses:
H. B. Davis.
R. Cornell.

Inventor:
Samuel R. Bailey
by Noyes & Harriman
Attys

UNITED STATES PATENT OFFICE.

SAMUEL R. BAILEY, OF AMESBURY, MASSACHUSETTS.

LOCK-JOINT FOR AUTOMOBILE WIND-SHIELDS.

1,171,829.  Specification of Letters Patent.  Patented Feb. 15, 1916.

Application filed December 14, 1914. Serial No. 877,018.

*To all whom it may concern:*

Be it known that I, SAMUEL R. BAILEY, a citizen of the United States, residing at Amesbury, in the county of Essex and State of Massachusetts, have invented an Improvement in Lock-Joints for Automobile Wind-Shields, of which the following is a specification.

This invention relates to certain improvements in lock joints for wind shields of automobiles, which permit the shield to be adjusted and locked at different angles. On account of the great strain which is placed on these joints, due to the wind pressure and leverage through which this force acts, much difficulty has been encountered in producing joints of this character which are not liable to slip or to become loosened, and, at the same time, to produce a joint which may be readily unlocked and readjusted. For obvious reasons, it is desirable, in devices of this character, to employ a simple thumb screw for operating the locking means, but, with many of these devices, it has been found that, either it was not possible to secure the necessary frictional engagement, by this means, to lock the joint with sufficient security, or, if this difficulty was obviated, to obviate the almost equally objectionable difficulty of having the parts of the joint bind, so that they could not be readily moved after they had been unlocked or released. It has further been ascertained that a simple set-screw, operating in the ordinary way, is generally inadequate for the purpose even though if tightened with a wrench, which is objectionable, as it is inconvenient, and particularly so on account of the fact that quite frequent, and often quick adjustments are necessary. Moreover, an ordinary set-screw, while perhaps the simplest form of locking means which may be employed, is objectionable, if frequent adjustments are necessary, for the reason that both the screw and the part engaged, soon become mutilated so that the screw cannot perform its function, even though it is tightened with such force as to twist it apart, or to strip the thread. A simple construction, in this connection, is, however, particularly desirable.

The objects of my invention are to produce a lock joint of the above-described character, which is of such simple construction that it may be manufactured at small expense, and will be unlikely to get out of order, which is adapted to lock the parts, through the medium of a thumb screw, so that they will not become loosened under any condition of use to which they are likely to be subjected, or is adapted to lock them partially, so that a friction joint is produced, which is adapted to be readily unlocked, so that the parts may be readjusted, and in which the tendency of the locking surfaces to bind, after they have been unlocked, is practically obviated. I accomplish these objects by the means shown in the accompanying drawing, in which;—

Figures 2, 3, 4, 5:
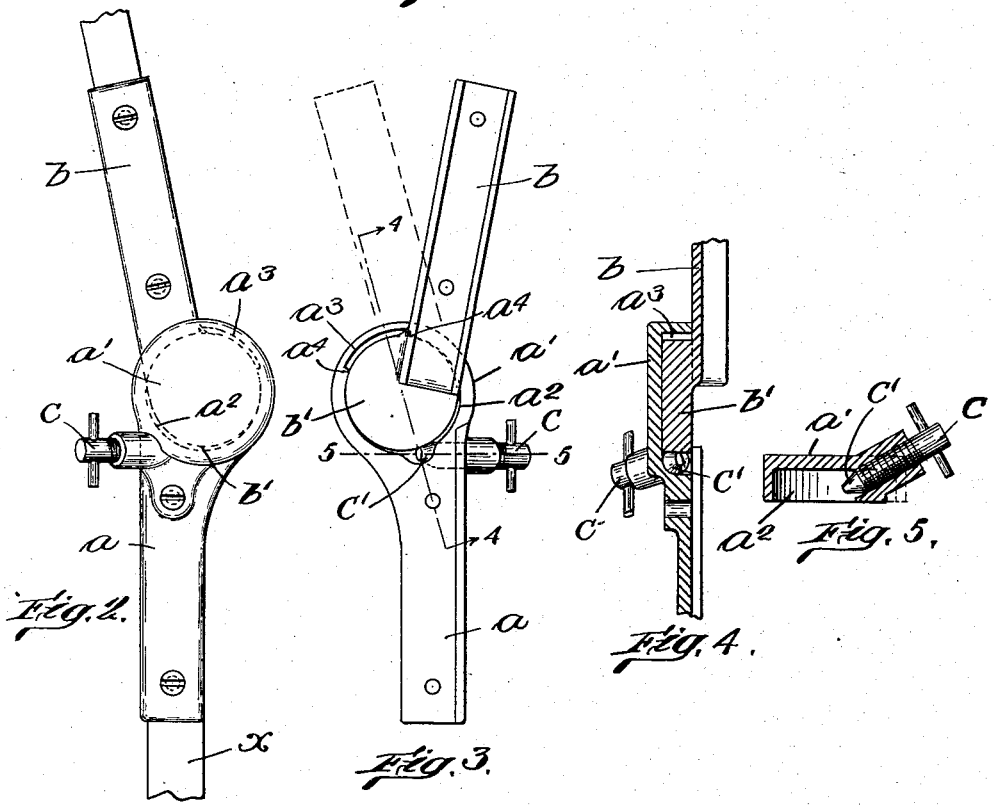

Figure 1 is a front elevation of a wind shield provided with joints embodying my invention. Fig. 2 is a side elevation of an outer side of a lock joint embodying my invention. Fig. 3 is a side elevation of the inner side thereof. Fig. 4 is a cross sectional view on the line 4—4 of Fig. 3. Fig. 5 is a detail sectional view on the line 5—5 of Fig. 3.

Joints of this character are usually employed in pairs, and, in the present instance, the parts thereof are held in position by the wind shield, or dasher $x$, and require no other holding means. As these joints, aside from the fact that they are made as rights and lefts, are identical, the description will be confined to a single joint.

In the drawing, $a$ indicates the fixed member, which is provided with a cylindrically shaped head-portion $a'$, having a circular chamber $a^2$ in the inner side thereof, and $b$ the movable member having a cylindrically shaped trunnion $b'$, which is adapted to fit freely, and to rotate easily in the chamber $a^2$.

According to my invention, I provide a thumb screw $c$, which is threaded in a boss on the fixed member $a$ in an oblique position, with relation to the outer side thereof, and also in such a position that its axial line extends approximately tangentially to the peripheral surface of said trunnion. The end of said screw $c$, is provided with a conically shaped engaging face $c'$, said screw being so located and said face being tapered at such an angle, that, when the screw is turned inward, the face will tangentially engage, at an intermediate point, the peripheral surface of the trunnion $b'$, so that said face will be forced, when the screw is moved axially, obliquely against the trunnion and will therefore have a wedging action to force the trunnion against the opposite side of the chamber $a^2$ from that at which it is engaged by said screw.

The circular side wall of the trunnion-receiving chamber $a^2$ is cut away to provide a segmental recess $a^3$, which is about a quadrant in length, and the middle point of which is approximately, though not necessarily exactly diametrically opposite the point of contact of the conical face $c'$ with the trunnion, so that no bearing surface is provided for the peripheral portion of the trunnion next said recess $a^3$, and converging bearing surfaces $a^4$ are provided therefor at the ends of said recess.

With the above-described construction, when the screw $c$ is screwed inwardly, the wedging action of its conical face $c'$, on the trunnion, will act to force the latter into the recess $a^3$ to a slight extent, and, as the depth of said recess is such that the trunnion cannot engage the bottom thereof, it follows that the entire wedging force on the trunnion will be effective in pressing the same against the surfaces $a^4$ between which it will become wedged and securely locked. By this means, the trunnion is locked against rotation much more effectively than it would be if the entire wall of the chamber were cylindrical, for the reason that, if the recess $a^3$ were not provided, there would be practically only one point at which the trunnion would be pressed with the maximum force, against the side of the cylindrical cavity which receives it, which point would be diametrically opposite the point of engagement of the locking screw with the trunnion, or in the line in which the trunnion is forced by the locking screw; while, with applicant's construction, the full force of engagement is applied at two points, giving a greater frictional surface. Moreover, the curved surface of the trunnion is not forced perpendicularly against the correspondingly curved internal surface of the fixed member, but it is forced obliquely against said surface, at the two points of contact, so that a mechanical advantage is secured through the wedging effect, which greatly increases the effectiveness of the lock, for a certain force. In like manner, the wedging effect of the tangentially arranged screw results in causing the trunnion to be pressing against the opposite side of the trunnion-receiving cup with much greater force than it would be pressed, by the same force, if the action were direct, or in a radial line, and, as a consequent result, the frictional engagement of the screw with the peripheral face portion of the trunnion, which is directly engaged thereby, is also much stronger than if the action were direct. As these points of frictional engagement with the trunnion are all on its periphery, the maximum holding effect thereon is secured.

For these reasons, the joint will be securely locked in any position to which it may be adjusted with a comparatively small expenditure of force, or with the force which may be easily applied with the fingers.

When the locking screw is unscrewed, it is positively carried out of engagement with the trunnion, thus permitting the latter to move out of locking engagement with the surfaces $a^4$, so that the trunnion will be free to rotate in the fixed member.

By arranging the locking screw obliquely with relation to the plane in which the movable member swings, it may be operated quite as conveniently, and a greater arc of adjustment of the movable member is permitted than if the screw were located in said plane of movement.

It will be apparent that the above described device is of simple construction, and may be manufactured at low cost. Further, there are no loose parts which are likely to be lost and there is no mechanism which is likely to get out of order. The device is also durable, as the wedging engagement of the locking screw does not tend to cut the surface of the trunnion, so that it is likely to become mutilated, or so that the locking effect of the parts may become impaired.

As the locking is entirely frictional, and not positive, the joint may be adjusted without unscrewing the screw $c$, provided said screw has not been tightened to too great an extent.

It will be understood that the terms "fixed" and "movable" used in the claims to distinguish the members of the joint, are merely relative; although, as a matter of convenience, the specific arrangement, shown in Fig. 1, is preferable.

I claim:—

1. A lock joint comprising a fixed and movable member, said movable member having a trunnion rotatably mounted in the fixed member, and a locking screw threaded in the fixed member and obliquely movable with relation to the peripheral surface of the trunnion, into wedging engagement therewith, to lock the trunnion against rotation.

2. A lock joint comprising a fixed member, a movable member having a trunnion journaled therein, and a locking screw threaded in said fixed member in an axially tangential relation with the peripheral surface of the trunnion, said screw having an engaging face thereon disposed to be moved into wedging engagement with said peripheral surface.

3. A lock joint comprising a fixed and a movable member, said movable member having a trunnion journaled in the fixed member, a locking screw threaded in said fixed member in an approximately axially tangential relation with the peripheral surface of the trunnion and having a conical face at its end disposed to be moved into wedging engagement with said surface, to lock said trunnion against rotation.

4. A lock joint comprising a fixed member having a circular cavity, a movable member having a trunnion rotatably mounted in said cavity, and a locking screw threaded in said fixed member and disposed in an approximately axially tangential relation to the peripheral surface of the trunnion, said screw having an engaging face convergently arranged with relation to an adjacent portion of said peripheral surface, and movable into wedging engagement therewith, to lock the trunnion.

5. A lock joint comprising a movable member having a trunnion, a fixed member provided with a circular bearing chamber to receive said trunnion, and having a segmental recess leading from its bearing surface, to form converging bearing portions for the trunnion at the ends of said recess, and a locking device disposed to force said trunnion laterally between said bearing portions and wedge the same therebetween.

6. A lock joint comprising a movable member having a trunnion, a fixed member provided with a circular bearing chamber to receive said trunnion, and having a segmental recess leading from its bearing surface to form converging bearing portions for the trunnion at the ends of said recess, a locking-screw threaded in said fixed member and movable into frictional engagement with the peripheral surface of the trunnion at points diametrically opposite said recess, to force the trunnion into frictional engagement with said converging bearing portions of the fixed member.

7. A lock joint comprising a movable member having a trunnion, a fixed member provided with a circular bearing chamber to receive said trunnion, and having a segmental recess leading from its bearing surface, to form converging bearing portions for the trunnion at the ends of said recess, a locking-screw threaded in said fixed member in tangential relation to the peripheral surface of the trunnion, having a tapering face, convergently arranged with relation to a peripheral surface portion of the trunnion, disposed diametrically opposite the portion next said recess and movable into wedging engagement therewith, to force said surface of the trunnion into wedging engagement with said bearing portions of the fixed member.

In testimony whereof, I have signed my name to this specification, in the presence of two subscribing witnesses.

SAMUEL R. BAILEY.

Witnesses:
L. H. HARRIMAN,
H. B. DAVIS.

Copies of this patent may be obtained for five cents each, by addressing the "Commissioner of Patents, Washington, D. C."